US007341653B2

(12) United States Patent
Hishida et al.

(10) Patent No.: US 7,341,653 B2

(45) Date of Patent: Mar. 11, 2008

(54) METHOD AND DEVICE FOR SEPARATING PARTICLE

(75) Inventors: Koichi Hishida, Yokohama (JP); Yohei Sato, Yokohama (JP); Takahiro Yamamoto, Yokohama (JP); Shankar Devasenathipathy, Yokohama (JP)

(73) Assignee: Keio University, Tokyo (JP)

( * ) Notice: Subject to any disclaimer, the term of this patent is extended or adjusted under 35 U.S.C. 154(b) by 621 days.

(21) Appl. No.: 10/938,551

(22) Filed: Sep. 13, 2004

(65) Prior Publication Data

US 2005/0092692 A1 May 5, 2005

(30) Foreign Application Priority Data

Sep. 17, 2003 (JP) ............................ 2003-324601

(51) Int. Cl.
*G01N 27/447* (2006.01)
*G01N 27/453* (2006.01)

(52) U.S. Cl. ...................................... 204/451; 204/601

(58) Field of Classification Search ........ 204/450–455, 204/600–605

See application file for complete search history.

(56) References Cited

U.S. PATENT DOCUMENTS 5,785,831 A * 7/1998 Bek ........................... 204/451

FOREIGN PATENT DOCUMENTS

JP A 2002-233792 8/2002

OTHER PUBLICATIONS

Jacobson et al. ("Microfluidic Devices for Electrokinetically Driven Parallel and Serial Mixing," Anal. Chem. 1999, 71, 4455-4459).*

Yager et al., "Applying Microfluidic Chemical Analytical Systems to Imperfect Samples," *MicroTAS Proceedings*, 1998, pp. 207-212.

Fu et al., "A Microfabricated Fluorescence-Activated Cell Sorter," *Nature Biotechnology*, vol. 17, 1999, pp. 1109-1111.

* cited by examiner

*Primary Examiner*—Alex Noguerola
(74) *Attorney, Agent, or Firm*—Oliff & Berridge PLC

(57) ABSTRACT

A plurality of types of liquid with different electrical conductivity flow through a micro channel having a plurality of channels. When an electric field is applied thereto, an electrokinetic driving flow generated in the micro channel attracts objective submicron particles to one side. Therefore, the particles are completely separated in a single operation by use of the micro channel having extremely simple structure, without the necessity of special machining of the channels and the like.

4 Claims, 9 Drawing Sheets

(A) STATIC DRIVING FLOW + ELECTROOSMOTIC FLOW (B) ELECTRIC LINES OF FORCE (A)+(B)

0 V
(pressure driven flow)

500 V

750 V

METHOD AND DEVICE FOR SEPARATING PARTICLE

CROSS-REFERENCE TO RELATED APPLICATION

The disclosure of Japanese Patent Application No. 2003-324601 filed Sep. 17, 2003 including specifications, drawings and claims is incorporated herein by references in their entireties.

BACKGROUND OF THE INVENTION

1. Field of the Invention

The present invention relates to a method and a device for separating submicron particles mixed into liquid. The present invention particularly relates to a method and a device for separating particles, the method and the device being appropriately applied to a micro total analysis system (Micro-TAS), a micro electro mechanical system (MEMS), and the like, in which analytical chemistry and micro chemistry technologies are integrated into a palm-size chip in thermal fluid mechanics, electrochemistry, and analytical chemistry on a micro/nano scale by use of a micromachine technology.

2. Description of the Related Art

The research and development of Lab-on-a-chip and Micro-TAS which are conceived to become large industry in a few years, that is, a palm-size device into which an experiment, analysis and the like at a conventional laboratory level are integrated is rapidly conducted. Many micro channels, the width of which is from several tens μm to several hundreds μm, are disposed in this device, and it is desired that the analysis of a little liquid sample, the reactive synthesis of a chemical agent and the like be effectively and rapidly carried out. A device to make a blood test, a DNA judgment operation, or the like possible has already been on the market in actuality. It is expected, on the other hand, to make the device further multifunctional, and especially it is deeply desired to establish technology for selectively separating particular particles and a particular material existing in a liquid sample.

Until now, the separation operation of the submicron particles existing in the analyzed liquid sample (in a buffer solution, in general) is generally carried out with the use of a large-scale centrifugal separator. In this method, it is possible to precisely separate and extract the particular particles by use of a filter which is smaller than the diameter of the objective particle. Thus, this method has been positively used in the field of analytical chemistry and the like. It is difficult, however, to add a centrifugal separation function to the device for the purpose of rapidly carrying out a series of chemical reaction operations in the device, so that there is a problem that the device is complicated.

Therefore, focusing attention on the viewpoint of thermal fluid mechanics, separation technologies using rheological properties in the device are developed in recent years. An H-filter (Paul Yager et al., MicroTAS 1998 proceedings, 202-212), being one of the separation technologies, which separates the particles or the material existing in the buffer solution by use of difference in a diffusion coefficient of the particles or the material, has an advantage that external mechanical driving force is not necessary.

The development of a cell sorter are also carried out (Anne Y. F. et al., Nature 1999, Vol. 17, 1109-1111). In this technology, the particles to be separated are impregnated with a fluorescent material, and are monitored with a sensor and separated by rheological switching control, and the like.

Furthermore, Japanese Patent Laid-Open Publication No. 2002-233792 proposes a method in which a solution including the particles flows through a channel and a voltage is applied at the midpoint of the channel so as to generate an electric field in the direction of crossing the channel. The particles are attracted by the generated electric field and captured on this side in the channel.

The H-filter, however, cannot completely separate the particles and the material by a single operation due to its principle. The addition of a particle separation function such as, for example, the centrifugal separation function makes the structure of the device complicated. The cell sorter, on the other hand, is hard to use for the particle separation operation in a field with high concentration such as an actual rheological field. Furthermore, the method disclosed in Japanese Patent Laid-Open Publication No. 2002-233792 has a problem that the method cannot separate the particles with enough efficiency.

SUMMARY OF THE INVENTION

In view of the foregoing problems, various exemplary embodiments of the present invention provide a device with simple structure for completely separating particular particles by a single operation, and a method thereof.

Various exemplary embodiments of the present invention provide a method for separating submicron particles mixed in liquid. The method comprises the steps of: providing a micro channel which has channels disposed in the shape of any one of the letter T, the letter Y, and a cross, and is structured so that the liquid flows into a single channel from a plurality of intake channels, and flowing a plurality of types of liquid having different electrical conductivity into the respective intake channels of the micro channel; and applying an electric field to the micro channel to attract objective submicron particles to one side of an outlet channel by an electrokinetic driving flow in the micro channel. Thereby, the abovementioned object can be achieved.

The micro channel may be a two-liquid mixing type of T-shaped micro channel.

Various exemplary embodiments of the present invention provide a particle separation device for separating submicron particles mixed in liquid. The particle separation device comprises: a micro channel having channels disposed in the shape of any one of the letter T, the letter Y, or a cross, and is structured so that the liquid flows into a single channel from a plurality of intake channels; means for flowing a plurality of types of liquid having different electrical conductivity into the micro channel; and means for applying an electric field to the micro channel to attract objective submicron particles to one side of an outlet channel by an electrokinetic driving flow in the micro channel.

According to various exemplary embodiments of the present invention, in, for example, the two-liquid mixing type of T-shaped micro channel having extremely simple structure, it is possible to completely separate the submicron particles in a single operation from, for example, the liquid with low electrical conductivity to the liquid with high electrical conductivity by use of the plurality of types of liquid having largely different conductivity. Also, various exemplary embodiments of the present invention are applicable to the particle concentration of every type of liquid, and never needs special machining of the channels and the like, so that it is possible to immediately apply various exemplary embodiments of the present invention to an actual device. Furthermore, it is possible to selectively separate and extract the submicron particles by difference in electric charge of the particles, and locally vary the particle concentration by varying the strength of the electric field. Therefore, various exemplary embodiments of the present invention contributes to making the device more multifunctional and further enhancing the performance of the device as elemental technology.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DETAILED DESCRIPTION OF THE PREFERRED EMBODIMENTS

Exemplary embodiments of the present invention will be hereinafter described in detail with reference to the accompanying drawings.

Figure 1A:
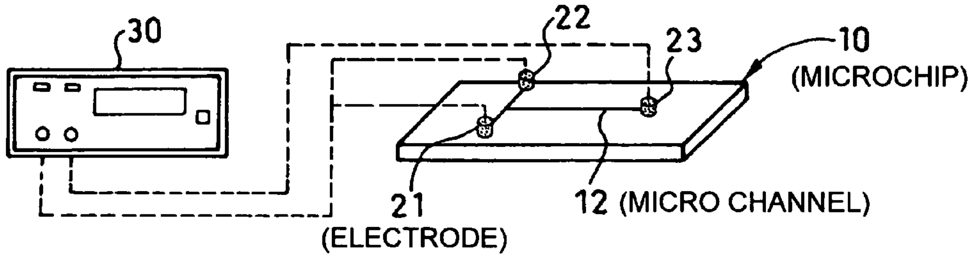
FIG. 1A is a perspective view showing the structure of a first exemplary embodiment of the present invention.
Figure 1B:
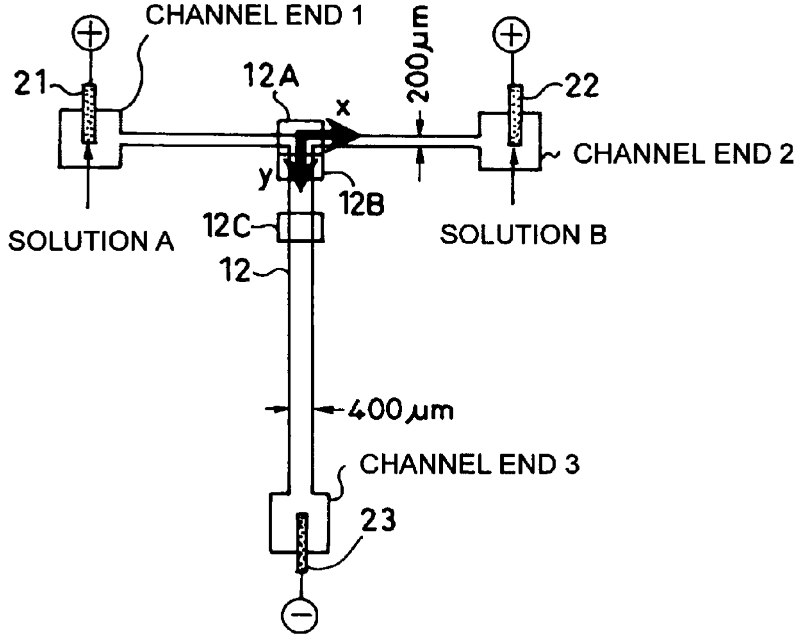
FIG. 1B is an explanatory view of a channel and FIG. 1C is a sectional view of a micro channel.
Figure 1C:
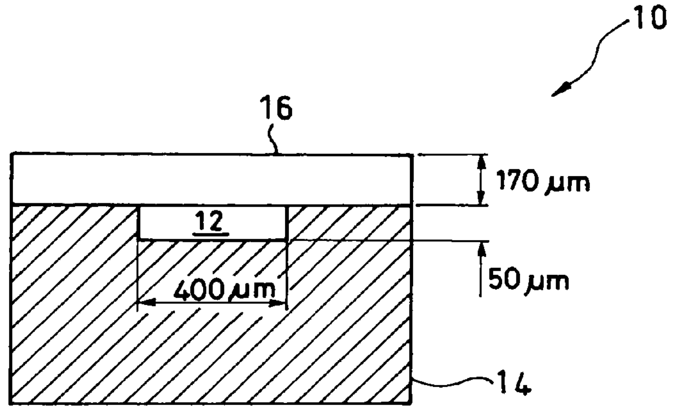

In a first exemplary embodiment of the present invention, a microchip 10 having a simple two-liquid mixing type of T-shaped micro channel 12 as shown in a perspective view of FIG. 1A, an explanatory view of FIG. 1B and a sectional view of FIG. 1C is used. As shown in FIG. 1C, this micro channel 12 made of PDMS (polydimethylsiloxanc) 14 by use of a soft lithography method was cemented to a cover glass 16 (diameter of 50 mm and thickness of 170 μm) for a microscope. The width of channels is 200 μm and 400 μm, and the depth thereof is 50 μm.

An HEPES buffer solution of 5 mM was used as a working fluid. Two types of a solution A and a solution B, the electrical conductivity of which was at a ratio of one to ten as shown in table 1, were prepared by adding potassium chloride (KCl)

TABLE 1

| 5 mM HEPES | Solution A | Solution B |
|---|---|---|
| pH | 7.2 | 7.2 |
| Electrical conductivity (μS/cm) | 270 | 2650 |

Polyethylene submicron particles (excitation wavelength of 540 nm/light emission wavelength of 560 nm), which were kneaded with a fluorescent material and had a diameter of 1.0 μm, were mixed into each solution at a volume ratio of 0.2%. Since carboxyl was added to the surface of the submicron particle used in this method, the surface of the particle was negatively charged in the buffer solution. Thus, the particles were dispersed in the solution by Coulomb force.

The solution A was injected into a channel end 1 shown in FIG. 1B, and the solution B was injected into a channel end 2. The solutions A and B were conveyed by a static driving flow due to difference in a fluid level with a channel end 3.

Then, platinum electrodes 21, 22 and 23 were inserted into each of the channel ends 1 to 3, respectively. A high voltage power source 30 applied a direct-current high voltage of 300 to 700V to the channel ends 1 and 2, and the channel end 3 was grounded. In other words, the working fluid is driven by the synthesis of the static driving flow and an electroosmotic flow, which is generated by the application of an electric field.

Figure 2:
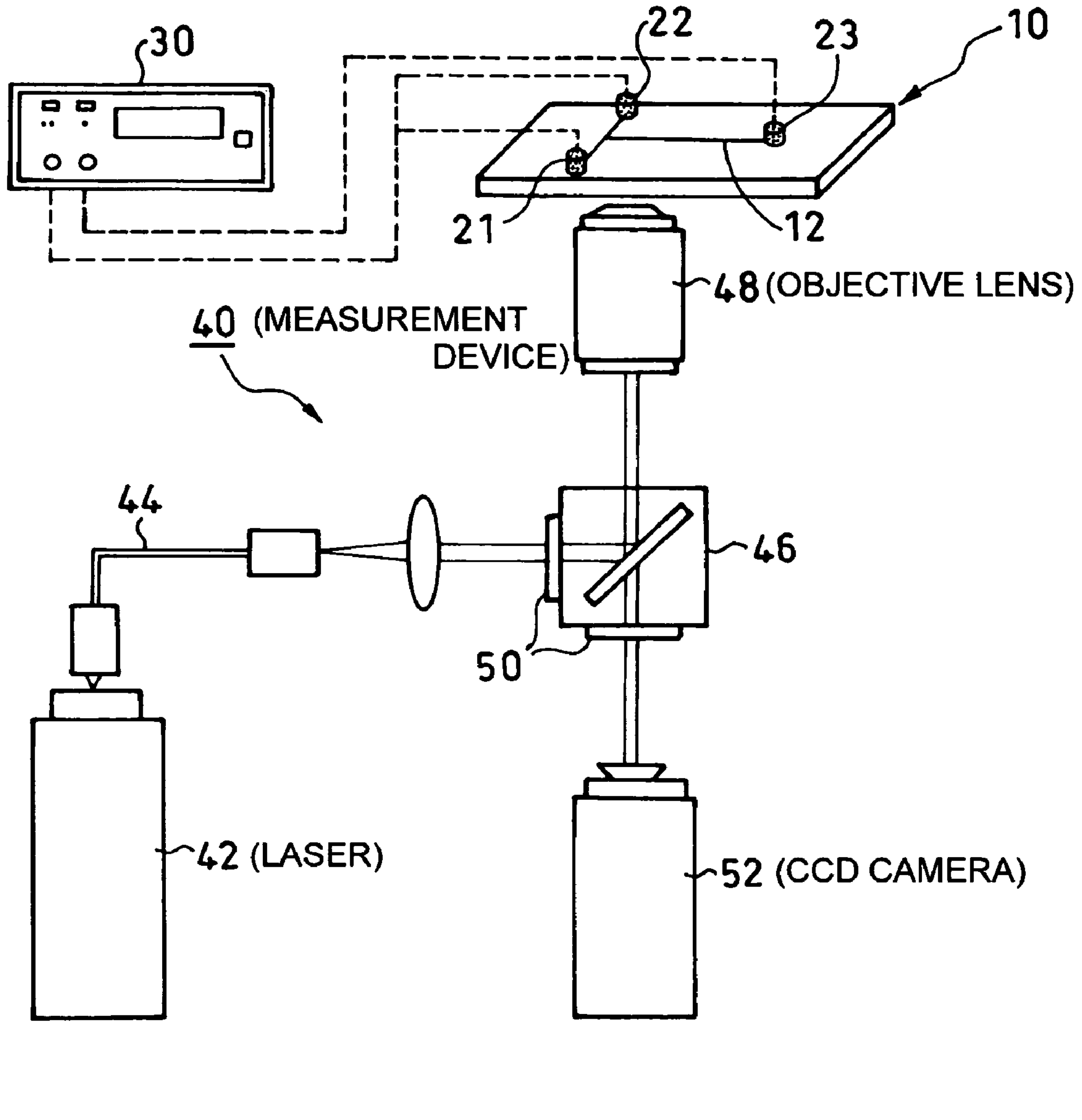
FIG. 2 is a perspective view showing the structure of a measurement device according to the first exemplary embodiment of the present invention.

A measurement device 40 which used a fluorescent microscope shown in a lower portion of FIG. 2 was used as a device for taking an image and measuring a flow inside the micro channel. An Nd:YAG laser (λ=532 nm) 42 being continuous light was used as a light source of the measurement device 40. Light from the Nd:YAG laser 42 was applied to the inside of the channel by use of a light transmitting fiber 44, a dichroic mirror 46 and an objective lens 48, and only a fluorescent light emission wavelength (λ=560 nm) from the submicron particles which were kneaded with the fluorescent material was extracted by use of various optical filters 50. A cooled CCD camera 52 with 494 pixels×656 pixels×12 bits took images.

The foregoing objective lens 48 at a magnifying power of 40 times has the effect of restraining the distortion of the image caused by the refraction of light. An oil-immersed objective lens (40×, NA=1.30) with a shallow measurement depth was used as the objective lens 48. According to an expression for a measurement depth which is defined by Meinhart et al. (Meinhart et al., Meas. Sci. Technol., Vol. 11, 809-814, 2000), the measurement depth of this measurement device is 3.7 μm when the diameter of the particle is 1.0 μm.

Figure 3:
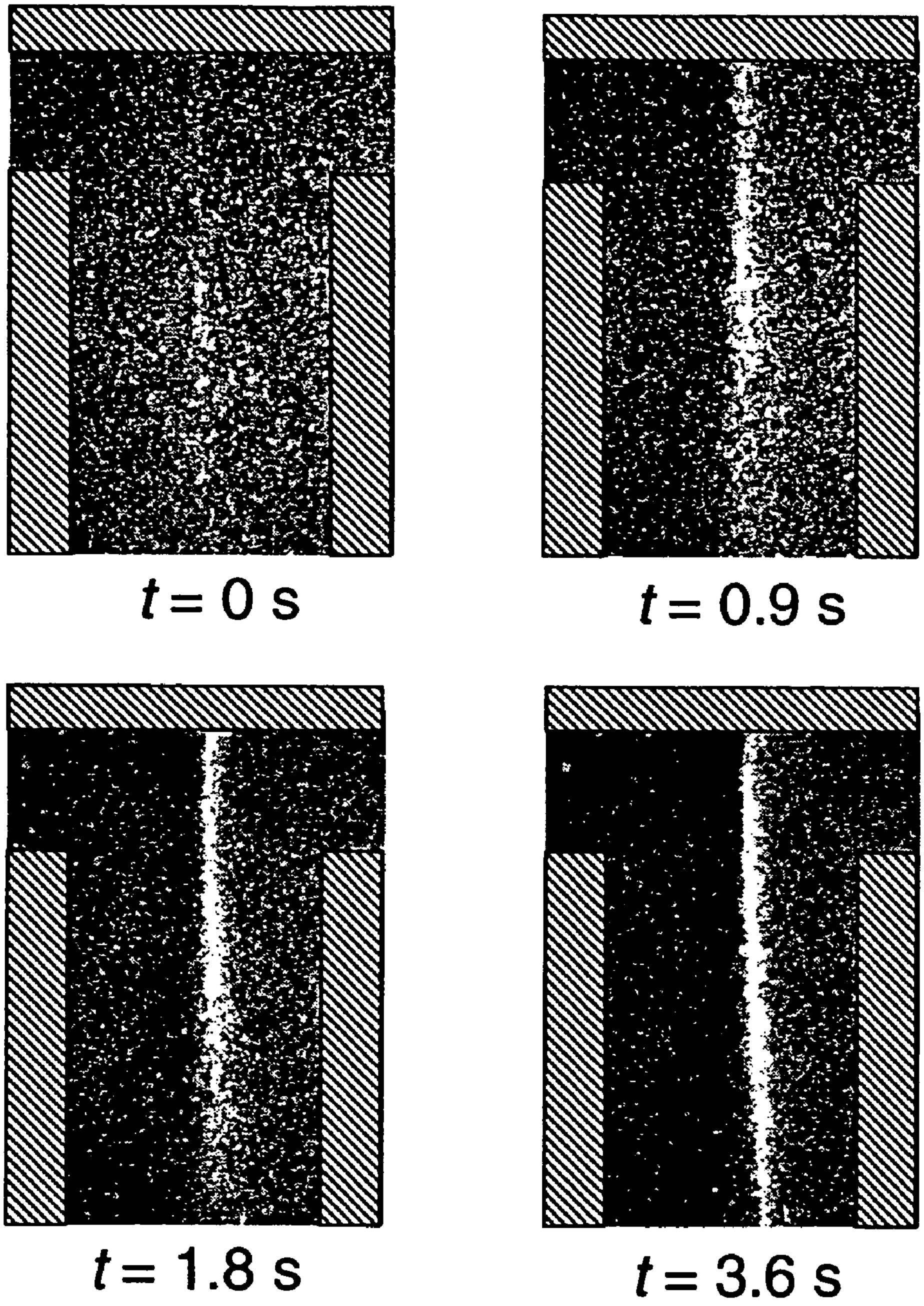
FIG. 3 is a diagram showing instantaneous images of a rheological field in a junction section of a T-shaped micro channel to explain the operation of one exemplary embodiment of the present invention.

The velocity of the submicron particles was measured from the images taken by the measurement device 40 with the use of a high spatial resolution micro particular image current meter (micro PIV), to verify the physical mechanism of particular separation. FIG. 3 shows time series instantaneous images in a junction section 12A (refer to FIG. 1B) of the T-shaped micro channel 12, when electric field application start time is defined as t=0. At t=0, the solutions A and B sent from the channel ends 1 and 2 at a regular flow rate flowed in a downstream direction (the y-direction) by the static driving flow, and the submicron particles evenly dispersed in each solution followed the static driving flow. After the start of the application of the electric field, the submicron particles existing in the solution A with low electrical conductivity moved to the solution B with high electrical conductivity. At t=3.6 sec, an uneven particle concentration field was observed.

Figure 4:
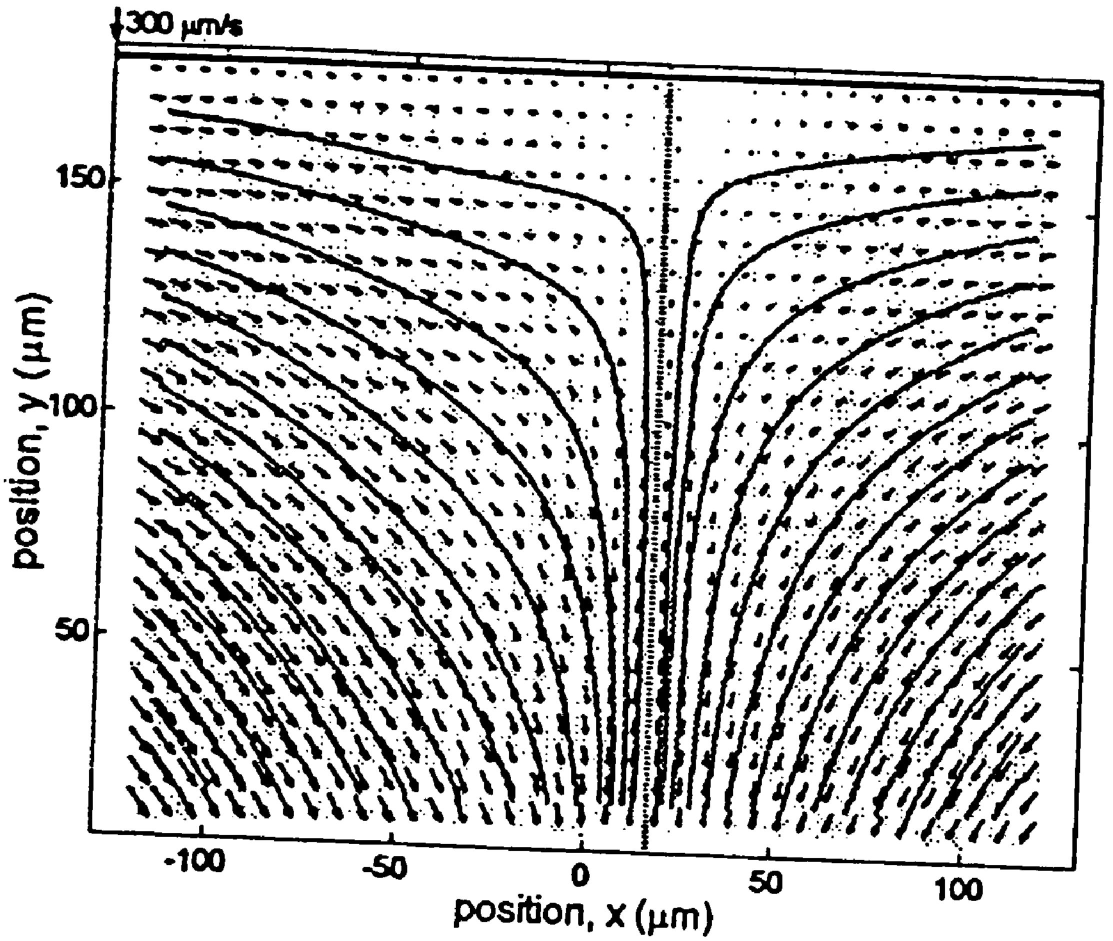
FIG. 4 is a diagram showing velocity distribution vectors and streamlines of submicron particles according to the same.

To grasp a movement phenomenon of the submicron particles in detail, FIG. 4 shows velocity vectors of the submicron particles in the junction section 12A (depth direction z=25 μm) measured by use of the micro PIV at a steady state after the application of the electric field. When velocity is calculated, velocity vectors at one hundred times are averaged by time in order to remove the effect of the Brownian movement of the submicron particles on velocity detection. It was quantitatively confirmed from FIG. 4 that the x-direction velocity of the submicron particles existing in the solution A was increased.

Figure 5:
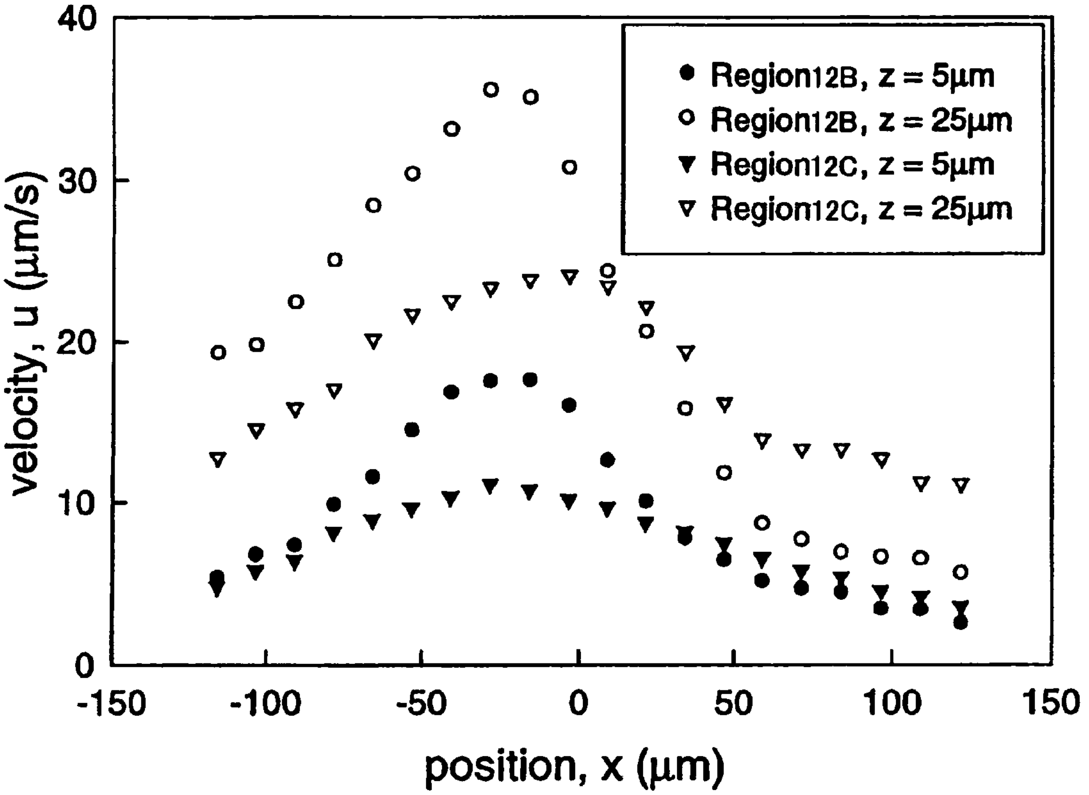
FIG. 5 is a diagram showing velocity components of the submicron particles in the x-direction in a downstream area of the junction section according to the same.

In the same manner, the x-direction velocity components u of the submicron particles in downstream areas 12B and 12C (depth direction z=5 μm and 25 μm) of the junction section shown in FIG. 1B are calculated and shown in FIG. 5. In all of the four areas in which measurement was carried out, it was found out that the submicron particles were moved in the x-direction, and were in movement velocity distribution, the peak value of which was in the vicinity of the center of the channel (mixture area of the solutions A and B by molecular diffusion) in which the gradient of electrical conductivity was especially large.

The movement of the submicron particles in the x-direction like this is not observed when two types of solutions with equal electrical conductivity flow. The ratio of electrical conductivity between the two types of solutions is an important parameter. When the ratio of electrical conductivity between the two types of solutions was 1:5 or 1:25, a similar phenomenon was confirmed in the present method. Namely, it is conceivable that an electric field in the x-direction occurs during the application of the electric field due to the effect of the gradient of electrical conductivity, which is formed in a case that two types of liquid with largely different electrical conductivity flow. The submicron particles negatively charged in the liquid are not only driven by convection (the sum of the static driving flow and the electroosmotic flow), but also driven in the x-direction by electrophoresis.

Figure 6A:
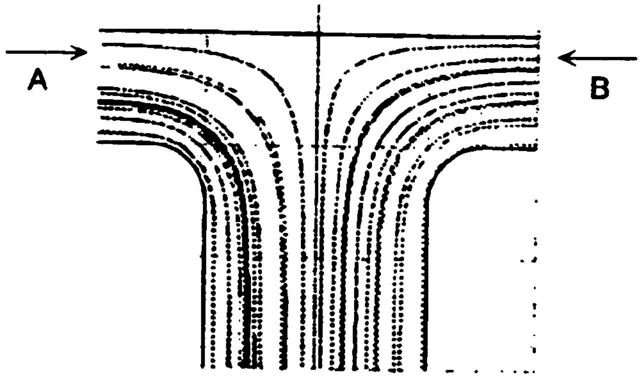
FIGS. 6A to 6C are diagrams showing streamlines of the synthesis of a static driving flow and an electroosmotic flow according to the same.
Figure 6B:
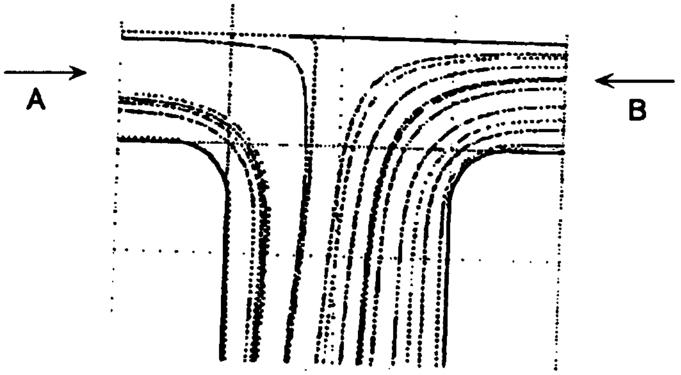
Figure 6C:
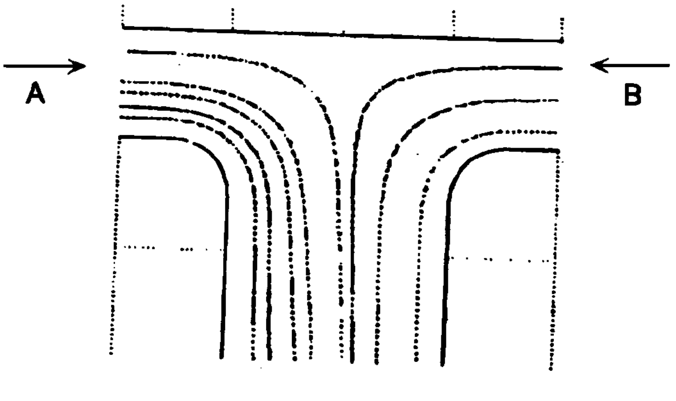

To elucidate the movement mechanism of the submicron particles by the application of the electric field when the gradient of electrical conductivity exists, a numerical simulation analysis was carried out. FIG. 6A shows streamlines of the synthesis of the static driving flow being a flow of the fluid itself and the electroosmotic flow. Both of the solutions A and B flow approximately symmetrically with respect to the center of the channel. Electric lines of force, however, are formed so as to cross from the solution B with high electrical conductivity to the solution A with low electrical conductivity as shown in FIG. 6B, so that the negatively charged particles are driven by the electrophoresis. Ultimately, as shown in FIG. 6C, the particles are separated from the solution A with low electrical conductivity to the solution B with high electrical conductivity.

Figure 7A:
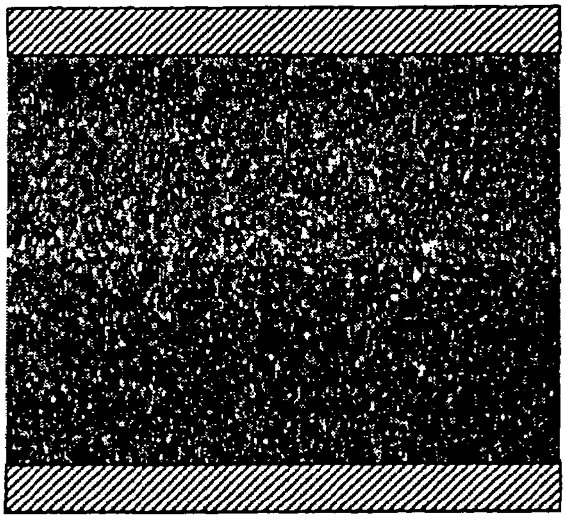
FIG. 7 is a diagram showing instantaneous images of the rheological field in the downstream area of the micro channel according to the same.
Figure 7B:
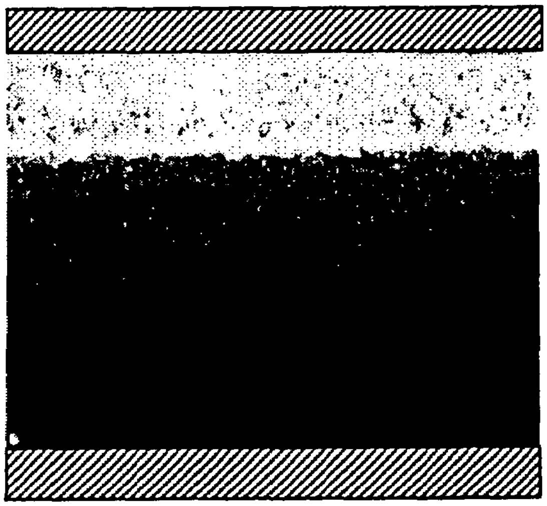
Figure 7C:
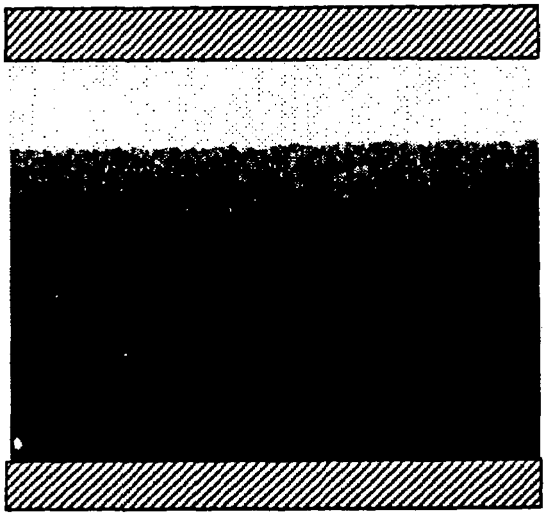

Ultimately, as shown in instantaneous images of a rheological field of FIGS. 7A to 7C, all of the evenly dispersed particles are moved into the solution B with high electrical conductivity in the downstream area 12C of the junction section (depth direction z=25 μm) after the application of the electric field. Therefore, it is possible to separate the particles. FIG. 7A is the instantaneous image before the start of the application of an electric field, and FIG. 7B is the instantaneous image after the application of an electric field of 500V. FIG. 7C is the instantaneous image after the application of an electric field of 750V.

Figure 8:
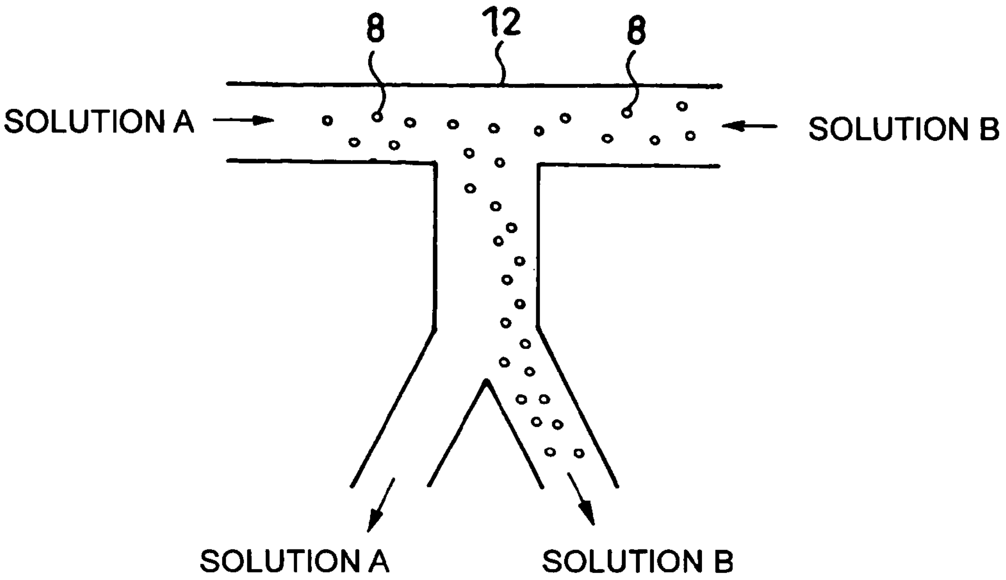
FIG. 8 is an explanatory view of a channel according to the first exemplary embodiment of the present invention.

In an actual application, as shown in FIG. 8, the selective separation and extraction of submicron particles 8 due to difference in electric charge of the particles 8 are possible by use of the asymmetrical distribution of electric potential formed by the gradient of electrical conductivity. It is possible to locally vary particle concentration by varying electric field intensity. Since such an operation is carried out with the use of the simple T-shaped micro channel and the electrodes, it is possible to easily apply this method to an actual Micro-TAS device.

According to this exemplary embodiment, the liquids with different electrical conductivity are made by adding potassium chloride KCl to the buffer solution. This is preferable because the diffusion coefficient of potassium K is almost equal to that of chlorine Cl. A material for varying the electrical conductivity may be sodium chloride NaCl other than potassium chloride KCl, for example.

In the foregoing exemplary embodiment, the HEPES buffer solution is used as the working fluid, but the type of the working fluid may be any other liquid as long as the liquid can be kept at a constant pH.

Figure 9:
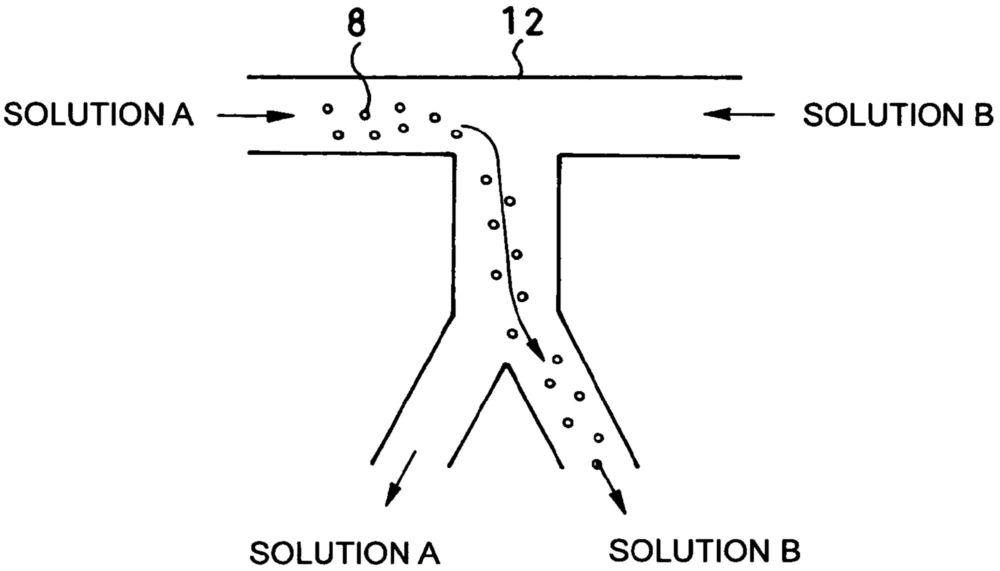
FIG. 9 is an explanatory view of a channel according to a second exemplary embodiment of the present invention.
Figure 10:
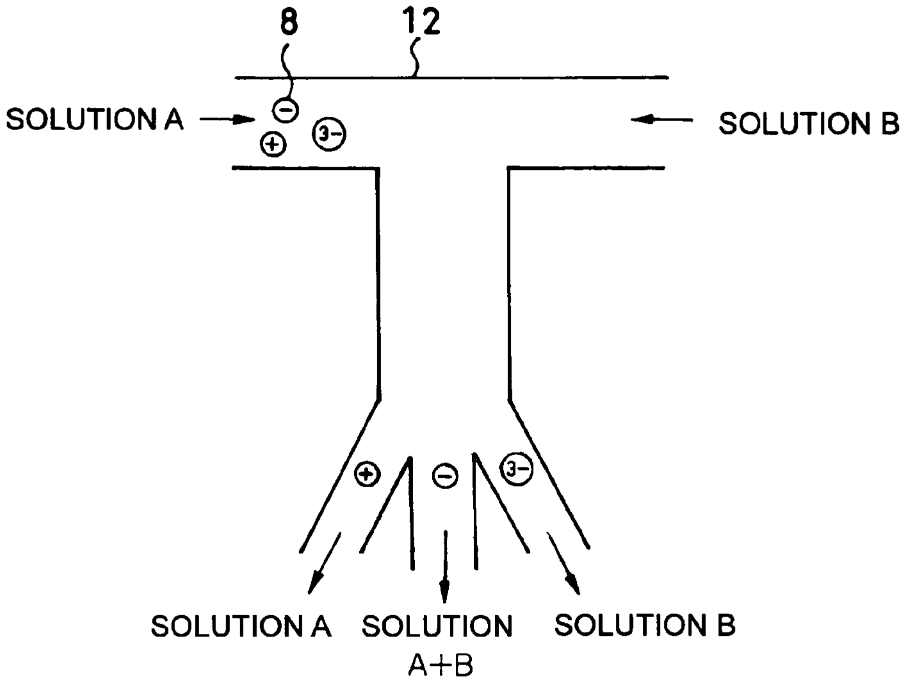
FIG. 10 is an explanatory view of a channel according to a third exemplary embodiment of the present invention.
Figure 11:
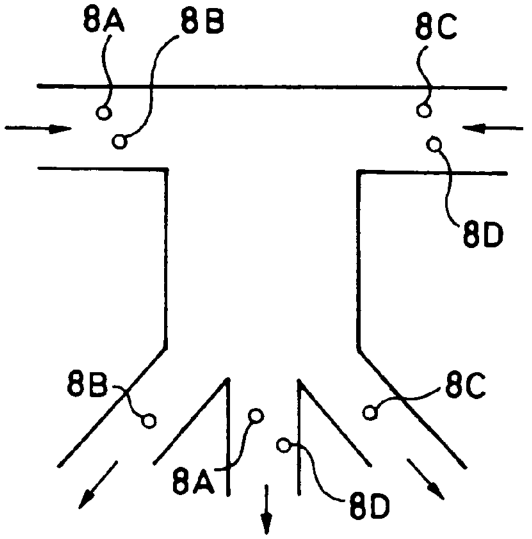
FIG. 11 is an explanatory view of a channel according to a fourth exemplary embodiment of the present invention.

In the foregoing exemplary embodiment, the same particles are mixed into both of the solution A and the solution B. In a second exemplary embodiment shown in FIG. 9, the present invention is applicable to a case where, for example, particles 8 mixed into a solution A are moved into a solution B. In a third exemplary embodiment as shown in FIG. 10, the present invention is applicable to a case where three types or more particles ("+," "−," and "3−" in the drawing) mixed in a solution are separated into three groups in accordance with respective electric charges. In a fourth exemplary embodiment shown in FIG. 11, the present invention is applicable to a case where a plurality of different particles 8A, 8B, 8C, and 8D injected from both ends are separated.

The shape of the micro channel may be the letter Y or a cross in addition to the letter T.

Although only a limited number of the embodiments of the present invention have been described, it should be understood that the present invention is not limited thereto, and various modifications and variations can be made without departing from the spirit and scope of the invention defined in the accompanying claims.

What is claimed is:

1. A method for separating submicron particles mixed in liquid, the method comprising the steps of:

providing a micro channel which has channels disposed in the shape of any one of the letter T, the letter Y, and a cross, and is structured so that the liquid flows into a single outlet channel from a plurality of intake channels, and flowing a plurality of types of liquid having a same or different concentration of the submicron particles respectively from the respective intake channels and different electrical conductivity respectively into the respective intake channels of the micro channel; and applying an electric field to the micro channel to attract at least one of the submicron particles from the plurality of intake channels to one side within the outlet channel by an electrokinetic driving flow in the micro channel.

2. The method for separating submicron particles according to claim 1, wherein the micro channel is a two-liquid mixing type of T-shaped micro channel.

3. The method for separating submicron particles according to claim 1, wherein the liquid having different electrical conductivity is prepared by adding potassium chloride or sodium chloride to an HEPES buffer solution.

4. A particle separation device for separating submicron particles mixed in liquid, the device comprising:

a micro channel having channels disposed in the shape of any one of the letter T, the letter Y, or a cross, and is structured so that the liquid flows into a single outlet channel from a plurality of intake channels;

means for flowing a plurality of types of liquid having a same or different concentration of the submicron particles respectively from the respective intake channels and different electrical conductivity respectively into the micro channel; and means for applying an electric field to the micro channel to attract at least one of the submicron particles from the plurality of intake channels to one side within the outlet channel by an electrokinetic driving flow in the micro channel.

* * * * *